United States Patent
Chang et al.

(10) Patent No.: US 12,154,344 B2
(45) Date of Patent: Nov. 26, 2024

(54) METHOD FOR EVALUATING ENVIRONMENT OF A PEDESTRIAN PASSAGEWAY AND ELECTRONIC DEVICE USING THE SAME

(71) Applicant: HON HAI PRECISION INDUSTRY CO., LTD., New Taipei (TW)

(72) Inventors: Yueh Chang, New Taipei (TW); Chin-Pin Kuo, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 380 days.

(21) Appl. No.: 17/562,297

(22) Filed: Dec. 27, 2021

(65) Prior Publication Data
US 2022/0207879 A1 Jun. 30, 2022

(30) Foreign Application Priority Data
Dec. 30, 2020 (CN) .......................... 202011613540.9

(51) Int. Cl.
*G06V 20/54* (2022.01)
*G06N 3/08* (2023.01)
(Continued)

(52) U.S. Cl.
CPC .............. *G06V 20/54* (2022.01); *G06N 3/08* (2013.01); *G06T 7/60* (2013.01); *G06T 7/73* (2017.01); *G06T 7/90* (2017.01); *G06V 10/56* (2022.01); *G06V 10/82* (2022.01); *G06T 2207/10024* (2013.01); *G06T 2207/20081* (2013.01);
(Continued)

(58) Field of Classification Search
CPC ........ G06V 20/54; G06V 10/56; G06V 10/82; G06V 2201/07; G06V 10/764; G06N 3/08; G06N 3/045; G06N 3/084; G06N 3/04; G06T 7/60; G06T 7/73; G06T 7/90; G06T 2207/10024; G06T 2207/20081; G06T 2207/20084; G06T 2207/30236; G06F 18/214
See application file for complete search history.

(56) References Cited

U.S. PATENT DOCUMENTS 10,067,509 B1 * 9/2018 Wang ........................ G06N 3/04
11,450,008 B1 * 9/2022 Tyagi ................... G06N 3/0464
(Continued)

FOREIGN PATENT DOCUMENTS

CN 109641538 4/2019

*Primary Examiner* — Xuemei G Chen
(74) *Attorney, Agent, or Firm* — ScienBiziP, P.C.

(57) ABSTRACT

A method for evaluating environment and surroundings of a pedestrian passageway, used in an electronic device, obtains a position information of a target area, and obtains a streetscape image corresponding to the position information of the area. The method further inputs the streetscape image into a trained convolutional neural network, makes the trained convolutional neural network carry out a convolution calculation of the streetscape image to generate a feature vector for classifying a number of target objects in the streetscape image, and outputs the feature vector. The feature vector is input into a full convolution neural network to apply a certain color to a number of pixels belonging to a same target object, and outputs the streetscape image with colored target objects.

15 Claims, 3 Drawing Sheets

(51) Int. Cl.
  *G06T 7/60*   (2017.01)
  *G06T 7/73*   (2017.01)
  *G06T 7/90*   (2017.01)
  *G06V 10/56*  (2022.01)
  *G06V 10/82*  (2022.01)

(52) U.S. Cl.
  CPC ............ *G06T 2207/20084* (2013.01); *G06T 2207/30236* (2013.01); *G06V 2201/07* (2022.01)

(56) References Cited

U.S. PATENT DOCUMENTS

| | | | |
|---|---|---|---|
| 12,087,010 B2* | 9/2024 | Zhou | G06F 18/214 |
| 2012/0147010 A1* | 6/2012 | Schmidt | G06T 11/206 |
| | | | 345/440 |
| 2016/0295128 A1* | 10/2016 | Schnittman | G06T 3/4038 |
| 2019/0057507 A1* | 2/2019 | El-Khamy | G06V 20/10 |
| 2019/0271550 A1* | 9/2019 | Breed | F21S 41/13 |
| 2020/0320401 A1* | 10/2020 | Jampani | G06N 3/047 |
| 2020/0364870 A1* | 11/2020 | Lee | G06N 3/048 |
| 2020/0394921 A1* | 12/2020 | Lee | G08G 1/017 |
| 2021/0049372 A1* | 2/2021 | Lee | G06T 7/55 |
| 2021/0127059 A1* | 4/2021 | Powell | G06T 5/80 |
| 2021/0150203 A1* | 5/2021 | Liu | G06V 20/56 |
| 2021/0406561 A1* | 12/2021 | Zhou | G06V 10/82 |
| 2022/0126439 A1* | 4/2022 | Mochizuki | G06T 7/00 |
| 2023/0135051 A1* | 5/2023 | Lee | G01C 21/3841 |
| | | | 705/14.36 |
| 2023/0222671 A1* | 7/2023 | Kim | G06T 7/20 |
| | | | 382/103 |

\* cited by examiner

METHOD FOR EVALUATING ENVIRONMENT OF A PEDESTRIAN PASSAGEWAY AND ELECTRONIC DEVICE USING THE SAME

CROSS-REFERENCE TO RELATED APPLICATIONS

This application claims priority to Chinese Patent Application No. 202011613540.9 filed on Dec. 30, 2020, in China National Intellectual Property Administration the contents of which are incorporated by reference herein.

FIELD

The subject matter herein generally relates to a field of deep learning, and especially relates to a method for evaluating environment of a pedestrian passageway and an electronic device.

BACKGROUND

When evaluating livable areas, in addition to conditions of house itself, the facilities and environment around the house are also important in affecting an evaluation of area, for example, pedestrian road facilities, traffic environment, and weather conditions around the house may persuade or dissuade potential buyers of the house. Therefore, within a preset limit of a house purchase budget, how to calculate a trade-off between various environments and facilities around the house is very important. Thus, in a process of evaluating the environments and facilities around the house, a pedestrian friendly environment of a passageway is undoubtedly an important indicator to add points to a local environment of the house. However, at present, there is no effective method to assist people to evaluate the environment of the pedestrian passageway.

BRIEF DESCRIPTION OF THE DRAWINGS

Implementations of the present disclosure will now be described, by way of embodiment, with reference to the attached figures.

DETAILED DESCRIPTION

Figure 1:
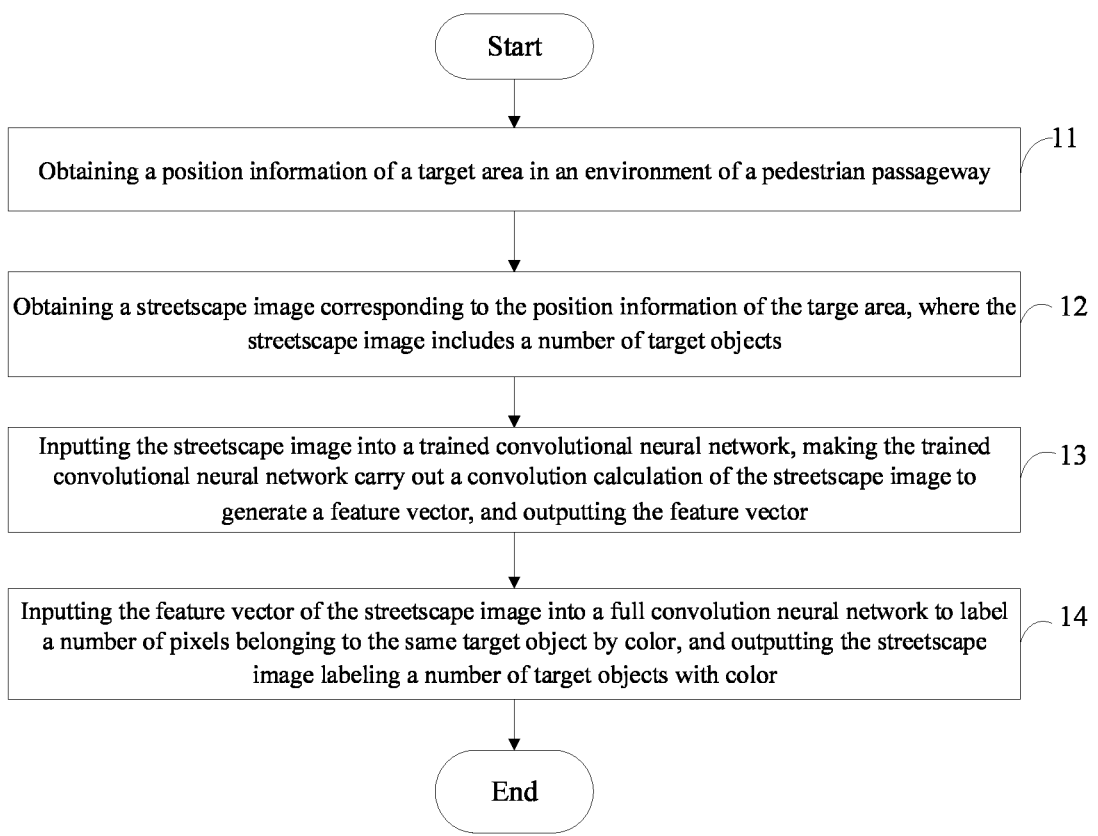
FIG. 1 is a flowchart of one embodiment of a method for evaluating surroundings of a pedestrian passageway according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for evaluating environment and surroundings of a pedestrian passageway is disclosed. The method is applied in one or more electronic devices. The hardware of the electronic device includes, but is not limited to, a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server, or other computing device. The device can carry out a human-computer interaction with user by a keyboard, a mouse, a remote controller, a touch pad or a voice control device.

FIG. 1 illustrates the method for evaluating environment of a pedestrian passageway. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, obtaining a position information of a target area in an environment of a pedestrian passageway.

In one embodiment, the position information includes longitude and dimension. The electronic device 6 obtains the longitude and the dimension of the area. In one embodiment, the electronic device 6 obtains the longitude and the dimension of the target area by a GPS positioning device. In another embodiment, the electronic device 6 provides a user interface and receives the position information input by the user interface. In one embodiment, the target area can be a commercial or other building and an area of a street.

At block 12, obtaining a streetscape image corresponding to the position information of the target area, where the streetscape image includes a number of target objects.

In one embodiment, obtaining the streetscape image corresponding to the position information of the target area includes: querying an image database by the position information of the target area, and obtaining at least one streetscape image corresponding to the position information of the target area, where the image database includes a number of streetscape images, and each of the streetscape images corresponds to one position information. In one embodiment, each streetscape image includes at least one target object. The target object includes at least one of a bus stop sign, a roadside tree, a road, a sidewalk, an electric pole, a roadside bench, a roadside fire hydrant and an electric substation box. The target object in this application is not limited to above objects, and any facility or hardware object that hinders progress on the sidewalk or is otherwise conspicuous can be used as the target object in this application.

In one embodiment, obtaining the streetscape image corresponding to the position information of the target area includes: obtaining four streetscape images corresponding to the position information, the four streetscape images are respectively captured at four 90 degree angles of rotation, and the four streetscape images constitute a 360 angles panoramic image.

At block 13, inputting the streetscape image into a trained convolutional neural network, making the trained convolutional neural network carry out a convolution calculation of the streetscape image to generate a feature vector for classifying the number of the target objects in the streetscape image, and outputting the feature vector.

In one embodiment, the electronic device 6 uses the trained convolution neural network to carry out a convolution calculation of the streetscape image to generate a feature map of the streetscape image, uses an object recognition and segmentation model to take each point of the feature map of the streetscape image as center points of frames with a certain sizes, compares each frame with the streetscape image to determine each of the target objects in the streetscape image, outputs a target frame that frames each of the target objects in the streetscape image, and classifies each of the target objects to obtain the feature vector. In one embodiment, the trained convolution neural network includes a convolution layer, a pooling layer, and a full connection layer. In one embodiment, the trained convolutional neural network includes ten convolution layers, three pooling layers, and three full connection layers.

In one embodiment, the method further includes: training a convolutional neural network to obtain the trained convolutional neural network. In one embodiment, training the convolutional neural network to obtain the trained convolutional neural network includes: establishing a training set by using a number of training images, each of the target objects being marked in each of the training images, training the convolutional neural network by using the training set to obtain the trained convolutional neural network.

In one embodiment, training the convolutional neural network by using the training set to obtain the trained convolutional neural network includes: by the convolution layer of the convolution neural network, making the training image in the training set carry out a convolution manipulation and outputting the feature map of the training image; making the feature map deal with dimension reduction by the pooling layer to generate a second feature map, and inputting the second feature map into the full connection layer, where the full connection layer is configured to synthesize the second feature map extracted after convolution operation and output a number of training parameters and a feature model of the convolution neural network, where the feature model is an abstract feature expression of the training image. Whether the convolutional neural network accords with a convergence condition must be determined, namely, determining whether the feature model is consistent with a preset standard feature model. When the feature model is consistent with the preset standard feature model, it is determined that the convolutional neural network accords with the convergence condition; when the feature model is not consistent with the preset standard feature model, it is determined that the convolutional neural network does not accord with the convergence conditions, and the preset standard feature model is the target object marked in the training image. In one embodiment, when the feature model accords with the preset standard feature model, the feature model is output; and when the characteristic model does not accord with the preset standard feature model, a weighting matrix of the convolutional neural network is adjusted in the manner of a back propagation.

In one embodiment, in a training process of the convolutional neural network, if there is an error between the feature model and the preset standard feature model, the error is transmitted back along an original path by back propagation, so as to correct the training parameters of each of layers (E. G, convolution layer and pooling layer) of the convolutional neural network. For example, the training parameters include a number of weighted values and bias, and a modified convolution layer and a pooling layer of the convolutional neural network are used to convolute the training data (for example training images) again until the feature model accords with the convergence condition. In one embodiment, when carrying out convolution operation of the convolutional neural network, a number of feature maps can be applied to the training image to obtain the features of the training image, and each feature map extracts a feature of the training image.

At block 14, inputting the feature vector of the streetscape image into a full convolution neural network to label a number of pixels belonging to the same target object by color, and outputting the streetscape image labeling a number of target objects with color.

In one embodiment, inputting the feature vector of the streetscape image into the convolution neural network to label a number of pixels belonging to the same target object by color, and outputting the streetscape image with target objects in color includes: inputting the feature vector of the streetscape image into the full convolution neural network to label the pixels belonging to the same target object in the feature vector by color, framing the pixels with a same color label together and the pixels with the same color label forming a same target object, and outputting the streetscape image with color label of the same target object.

In one embodiment, the method further includes: identifying the target objects from the streetscape image with color label of the target objects, and displaying the target objects by displaying text information.

The present disclosure inputs the feature vector of the streetscape image into the full convolution neural network to label the pixels belonging to the same target object in the feature vector by color, and outputs the streetscape image with color label of the target object, so that a classification of the target object can be distinguished by color from the streetscape image, so as to help people identify obstacles in the environment of the pedestrian passageway.

Figure 2:
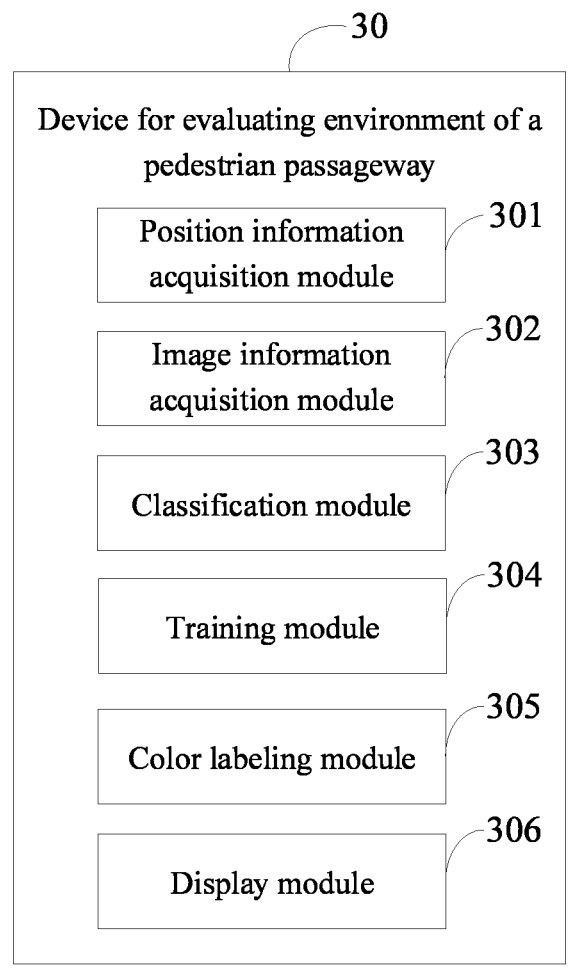
FIG. 2 is a block diagram of one embodiment of a device for evaluating surroundings of a pedestrian passageway according to the present disclosure.

FIG. 2 illustrates a device 30 for evaluating environment of a pedestrian passageway. The device 30 is applied in the electronic device 6. In one embodiment, according to the functions it performs, the device 30 can be divided into a plurality of functional modules. The functional modules perform the blocks 11-14 in the embodiment of FIG. 1 to perform the functions of evaluating environment of the pedestrian passageway.

In one embodiment, the device 30 includes, but is not limited to, a position information acquisition module 301, an image information acquisition module 302, a classification module 303, a training module 304, a color labeling module 305 and a display module 306. The modules 301-306 of the device 30 can be collections of software instructions. In one embodiment, the program code of each program segment in the software instructions can be stored and executed by at least one processor to perform the function of evaluating environment of the pedestrian passageway.

The position information acquisition module 301 obtains a position information of an area to be investigated in an environment of a pedestrian passageway.

In one embodiment, the position information of the target area includes longitude and dimension. The position information acquisition module 301 obtains the longitude and the dimension of the target area and regards the longitude and the dimension as the position information of the target area. In one embodiment, the position information acquisition module 301 obtains the longitude and the dimension of the target area to be detected by a GPS positioning device. In another embodiment, the position information acquisition module 301 provides a user interface and receives the position information input by the user interface. In one embodiment, the target area can be a commercial or other building and an area of an adjacent street.

The image information acquisition module 302 obtains a streetscape image corresponding to the position information of the target area, where the streetscape image includes a number of target objects.

In one embodiment, the image information acquisition module 302 queries an image database by the position information of the target area, and obtains at least one streetscape image corresponding to the position information, where the image database includes a number of streetscape images, and each of the streetscape images is corresponding to one position information. In one embodiment, each of the streetscape images includes at least one target object. A target object can include at least one of a bus stop sign, a roadside tree, a road, a sidewalk, an electric pole, a roadside bench, a roadside fire hydrant, and an electrical substation box. It should be noted that the target object in this application is not limited to above objects, and any conspicuous facility or hardware object that hinders progress on the sidewalk can be used as the target object in this application.

In one embodiment, the image information acquisition module 302 obtains four streetscape images corresponding to the position information of the target area, and the four streetscape images are captured at four 90 degree angles, and the four streetscape images constitute a 360 degree angles of panoramic image.

The classification module 303 inputs the streetscape image into a trained convolutional neural network, makes the trained convolutional neural network carry out a convolution calculation of the streetscape image to generate a feature vector for classifying a number of target objects in the streetscape image, and outputs the feature vector.

In one embodiment, the classification module 303 uses the trained convolution neural network to carry out a convolution calculation of the streetscape image to generate a feature map of the streetscape image. An object recognition and segmentation model is used to take each point of the feature map of the streetscape image as center points of frames with a certain sizes, compare each of the frames with the streetscape image to determine each target object in the streetscape image, output a number of target frames that frame each target object in the streetscape image, and classify each target object to obtain the feature vector. In one embodiment, the trained convolution neural network includes a convolution layer, a pooling layer, and a full connection layer. In one embodiment, the trained convolutional neural network includes ten convolution layers, three pooling layers, and three full connection layers.

In one embodiment, the training module 304 trains a convolutional neural network to obtain the trained convolutional neural network. In one embodiment, the training module 304 establishes a training set by using a number of training images and each target object is marked in each of the training images. The convolutional neural network is trained by using the training set to obtain the trained convolutional neural network.

In one embodiment, by the convolution layer of the convolution neural network, the training module 304 carries out a convolution calculation of the training image in the training set to generate the feature map of the training image, makes the feature map deal with dimension reduction by the pooling layer to generate a second feature map, and inputs the second feature map into the full connection layer, where the full connection layer is configured to synthesize the second feature map extracted after convolution process. The training module 304 outputs a number of training parameters and a feature model of the convolution neural network, where the feature model is an abstract feature expression of the training image. The training module 304 determines whether the convolutional neural network accords with a convergence condition, namely, determines whether the feature model is consistent with a preset standard feature model. When the feature model is consistent with the preset standard feature model, the training module 304 determines that the convolutional neural network accords with the convergence condition, and when the feature model is not consistent with the preset standard feature model, the training module 304 determines that the convolutional neural network does not accord with the convergence conditions, and the preset standard feature model is the target object marked in the training image. In one embodiment, when the feature model accords with the preset standard feature model, the feature model is output. When the characteristic model does not accord with the preset standard feature model, a weighting matrix of the convolutional neural network is adjusted by back propagation.

In one embodiment, in a training process of the convolutional neural network, if an error between the feature model and the preset standard feature model exists, the error is transmitted back along an original path of the convolutional neural network by back propagation, so as to correct the training parameters of each of layers (E. G, convolution layer and pooling layer) of the convolutional neural network. For example, the training parameters include a number of weighted values and bias, and a modified convolution layer and a pooling layer of the convolutional neural network are used to convolute the training data (for example training images) again until the feature model accords with the convergence condition. In one embodiment, when carrying out convolution process of the convolutional neural network, a number of feature maps can be applied to the training image to obtain the features of the training image, and each feature map extracts a feature of the training image.

The color labeling module 305 inputs the feature vector of the streetscape image into a full convolution neural network to label a number of pixels belonging to the same target object by color, and outputs the streetscape image labeling a number of target objects with color.

In one embodiment, the color labeling module 305 inputs the feature vector of the streetscape image into the full convolution neural network to label the pixels belonging to the same target object in the feature vector by color, frames the pixels with the same color label together and the pixels with the same color label forming the same target object, and outputs the streetscape image with colored target objects.

In one embodiment, the display module 306 identifies the target objects from the streetscape image with color, and displays the target objects by displaying text information.

Figure 3:
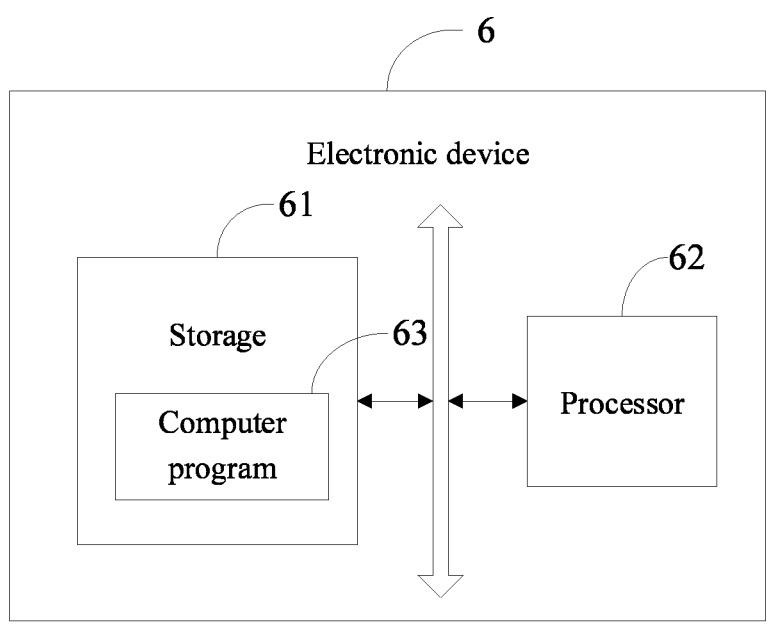
FIG. 3 is a schematic diagram of one embodiment of an electronic device using the method of FIG. 1 according to the present disclosure.

FIG. 3 illustrates the electronic device 6. The electronic device 6 includes a storage 61, a processor 62, and a computer program 63 stored in the storage 61 and executed by the processor 62. When the processor 62 executes the computer program 63, the processing in the embodiment of the method for evaluating environment of a pedestrian passageway are implemented, for example, blocks 11 to 14 as shown in FIG. 1. Alternatively, when the processor 62 executes the computer program 63, the functions of the modules in the embodiment of the device 30 for evaluating environment of a pedestrian passageway are implemented, for example, modules 301-307 shown in FIG. 2.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the position information acquisition module 301, the image information acquisition module 302, the classification module 303, the training module 304, the color labeling module 305, and the display module 306 as shown in FIG. 2.

FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules or units stored in the storage 61 and calling up the data stored in the storage 61.

In one embodiment, the storage 61 may include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a high-speed random access memory, and may also include a non-volatile memory, such as a hard disk, an internal memory, a plug-in hard disk, a smart media card (SMC), a secure digital (SD) card, a flash card, at least one disk storage device, a flash memory device, or other volatile solid state storage device.

In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for evaluating environment of a pedestrian passageway comprising:
   obtaining a position information of a target area in an environment of a pedestrian passageway;
   obtaining a streetscape image corresponding to the position information of the target area, wherein the streetscape image comprises a plurality of target objects;
   inputting the streetscape image into a trained convolutional neural network, making the trained convolutional neural network carry out a convolution calculation of the streetscape image to generate a feature vector for classifying the plurality of the target objects in the streetscape image, and outputting the feature vector, comprising: using the trained convolutional neural network to carry out a convolution calculation of the streetscape image to generate a feature map of the streetscape image; using an object recognition and segmentation model to take each point of the feature map of the streetscape image as center points of frames; comparing each of the frames with the streetscape image to determine each of the target objects in the streetscape image; outputting a plurality of target frames that framing each of the target objects in the streetscape image, and classifying each of the target objects to obtain the feature vector;
   inputting the feature vector into a full convolution neural network to label a plurality of pixels belonging to a same target object by color, and outputting the streetscape image labeling a plurality of target objects with color.

2. The method as recited in claim 1, further comprising:
obtaining longitude and dimension of the target area and regarding the longitude and the dimension as the position information of the target area.

3. The method as recited in claim 1, further comprising:
obtaining four streetscape images corresponding to the position information of the target area, wherein the four streetscape images are respectively shoot at four continuous rotation angle of 90 degree angles of rotation, and the four streetscape images constitute a 360 degree angles of panoramic image.

4. The method as recited in claim 1, further comprising:
inputting the feature vector of the streetscape image into the full convolution neural network to label the pixels belonging to the same target object by color;
framing the pixels with same color label together and the pixels with the same color label forming a same target object, and outputting the streetscape image with color label of the same target object.

5. The method as recited in claim 1, further comprising:
identifying the target objects from the streetscape image with color label of the target objects, and displaying the target objects by displaying text information.

6. An electronic device comprising:
a processor; and
a non-transitory storage medium coupled to the processor and configured to store a plurality of instructions, which cause the processor to:
obtain a position information of a target area in an environment of a pedestrian passageway;
obtain a streetscape image corresponding to the position information of the target area, wherein the streetscape image comprises a plurality of target objects;
input the streetscape image into a trained convolutional neural network, make the trained convolutional neural network carry out a convolution calculation of the streetscape image to generate a feature vector for classifying the plurality of the target objects in the streetscape image, and output the feature vector, comprising: using the trained convolutional neural network to carry out a convolution calculation of the streetscape image to generate a feature map of the streetscape image; using an object recognition and segmentation model to take each point of the feature map of the streetscape image as center points of frames; comparing each of the frames with the streetscape image to determine each of the target objects in the streetscape image;
outputting a plurality of target frames that framing each of the target objects in the streetscape image, and classifying each of the target objects to obtain the feature vector;
input the feature vector into a full convolution neural network to label a plurality of pixels belonging to a same target object by color, and output the streetscape image labeling a plurality of target objects with color.

7. The electronic device as recited in claim 6, wherein the plurality of instructions are further configured to cause the processor to:
obtain longitude and dimension of the target area and regard the longitude and the dimension as the position information of the target area.

8. The electronic device as recited in claim 6, wherein the plurality of instructions are further configured to cause the processor to:
obtain four streetscape images corresponding to the position information of the target area, wherein the four streetscape images are respectively shoot at four 90 degree angles of rotation, and the four streetscape images constitute a 360 degree angles of panoramic image.

9. The electronic device as recited in claim 6, wherein the plurality of instructions are further configured to cause the processor to:
input the feature vector of the streetscape image into the full convolution neural network to label the pixels belonging to the same target object by color;
frame the pixels with same color label together and the pixels with the same color label forming a same target object, and output the streetscape image with color label of the same target object.

10. The electronic device as recited in claim 6, wherein the plurality of instructions are further configured to cause the processor to:
identify the target objects from the streetscape image with color label of the target objects, and display the target objects by displaying text information.

11. A non-transitory storage medium having stored thereon instructions that, when executed by at least one processor of an electronic device, causes the least one processor to execute instructions of a method for evaluating environment of a pedestrian passageway, the method comprising:
obtaining a position information of a target area in an environment of a pedestrian passageway;
obtaining a streetscape image corresponding to the position information of the target area, wherein the streetscape image comprises a plurality of target objects;
inputting the streetscape image into a trained convolutional neural network, making the trained convolutional neural network carry out a convolution calculation of the streetscape image to generate a feature vector for classifying the plurality of the target objects in the streetscape image, and outputting the feature vector, comprising: using the trained convolutional neural network to carry out a convolution calculation of the streetscape image to generate a feature map of the streetscape image; using an object recognition and segmentation model to take each point of the feature map of the streetscape image as center points of frames; comparing each of the frames with the streetscape image to determine each of the target objects in the streetscape image; outputting a plurality of target frames that framing each of the target objects in the streetscape image, and classifying each of the target objects to obtain the feature vector;
inputting the feature vector into a full convolution neural network to label a plurality of pixels belonging to a same target object by color, and outputting the streetscape image labeling a plurality of target objects with color.

12. The non-transitory storage medium as recited in claim 11, wherein the method for evaluating environment of a pedestrian passageway comprising:
obtaining longitude and dimension of the target area and regarding the longitude and the dimension as the position information of the target area.

13. The non-transitory storage medium as recited in claim 11, wherein the method for evaluating environment of a pedestrian passageway comprising:
   obtaining four streetscape images corresponding to the position information of the target area, wherein the four streetscape images are respectively shoot at four 90 degree angles of rotation, and the four streetscape images constitute a 360 degree angles of panoramic image.

14. The non-transitory storage medium as recited in claim 11, wherein the method for evaluating environment of a pedestrian passageway comprising:
   inputting the feature vector of the streetscape image into the full convolution neural network to label the pixels belonging to the same target object by color;
   framing the pixels with same color label together and the pixels with the same color label forming a same target object, and outputting the streetscape image with color label of the same target object.

15. The non-transitory storage medium as recited in claim 11, wherein the method for evaluating environment of a pedestrian passageway comprising:
   identifying the target objects from the streetscape image with color label of the target objects, and displaying the target objects by displaying text information.

* * * * *